March 22, 1960  F. KŘEMÍNSKÝ  2,929,296
SLIDE CHANGING DEVICE

Filed March 28, 1958  2 Sheets-Sheet 1

March 22, 1960 F. KŘEMÍNSKÝ 2,929,296
SLIDE CHANGING DEVICE
Filed March 28, 1958 2 Sheets-Sheet 2

2,929,296

SLIDE CHANGING DEVICE

František Křemínský, Rokytnice, near Prerov, Czechoslovakia, assignor to Meopta Prerov, narodni podnik, Prerov, Czechoslovakia Application March 28, 1958, Serial No. 725,468

Claims priority, application Czechoslovakia March 28, 1957

3 Claims. (Cl. 88—28)

The present invention relates to a slide projector with a storage drawer or magazine for the slides, and wherein the slides are inserted one after the other into the picture gate of the projector and back into the storage drawer by manually operating a slide piece.

Projectors are known having one or two storage drawers provided with transport springs and also possessing an intermittently acting mechanism for moving the slides into and out of the picture gate. Other known projectors are equipped with a special gear for shifting the storage drawer through a distance equal to the thickness of one slide, whereupon, the slide aligned with the picture gate is inserted in the latter by actuation of another device, for example, as in U.S. Patent No. 2,274,989. In other known devices of this kind, each of the slides is pushed into the gate by a simple motion of a manually operated slide-piece, which, during its return movement, causes the storage drawer to step forward through a distance equal to the thickness of one slide by means of a gear with curved guide, for example, as disclosed in German patent application No. L 18,460 IX/42h. Devices of the last mentioned kind are rather complicated, so that their fabrication is difficult and they are subject to frequent operating difficulties or failures.

The device to which this invention relates avoids the above mentioned drawbacks and further ensures reliable operation. The invention consists in that the manually operated slide-piece has a cam pivotally mounted thereon to swing in one direction out of alignment with the slide-piece. At the beginning of the operative movement of the slide-piece, the cam causes longitudinal displacement of the storage drawer through a distance equal to the thickness of one slide, this action being effected by the force exerted by an oblique surface of the cam against a first partition wall of the storage-drawer. In a second phase of the operative movement of the slide-piece, a curved surface of the cam slidably engages a second partition wall confronting said first partitional wall and moves the cam into alignment with the slide-piece for movement with the latter between the first and second partition walls so as to propel the slide supported between the walls through a guide into the picture gate of the projector.

Figure 1:
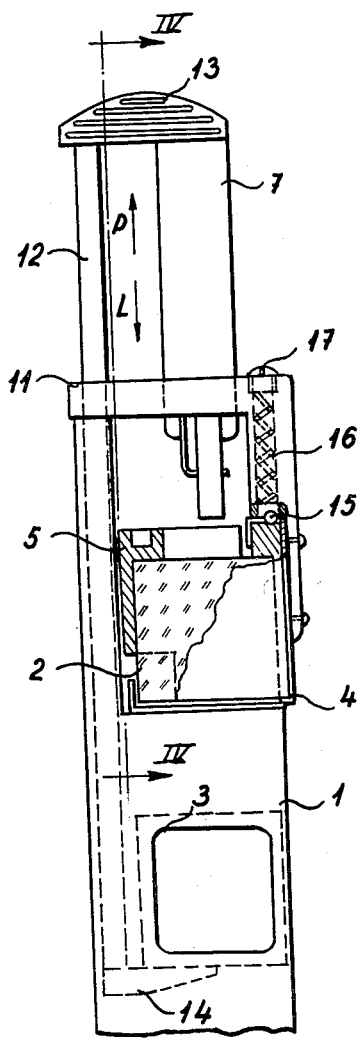
Figure 2:
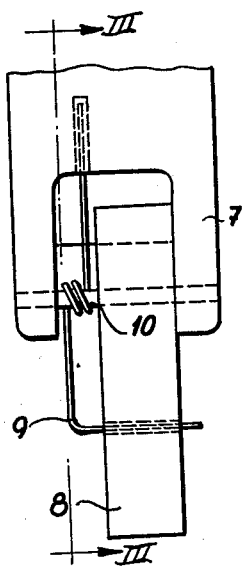
Figure 3:
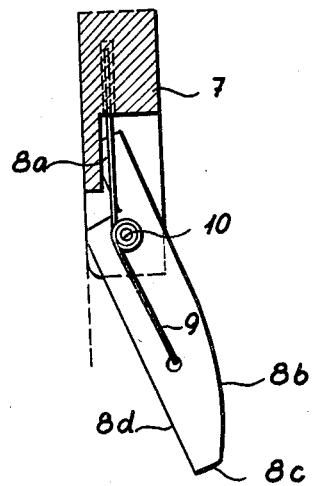
Figure 4:
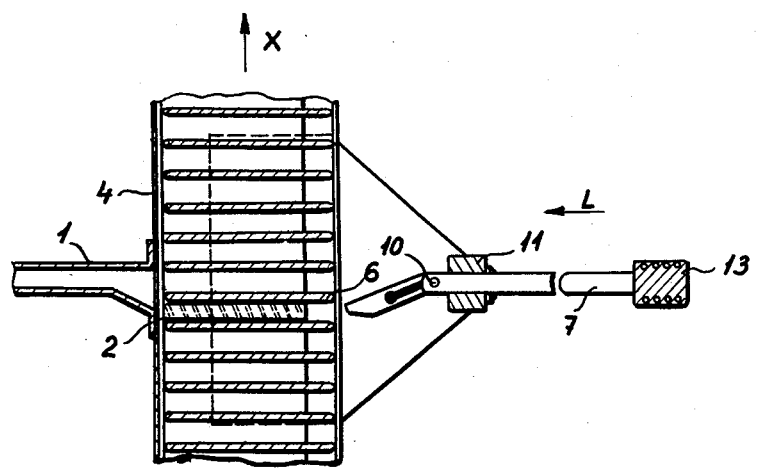
Figure 5:
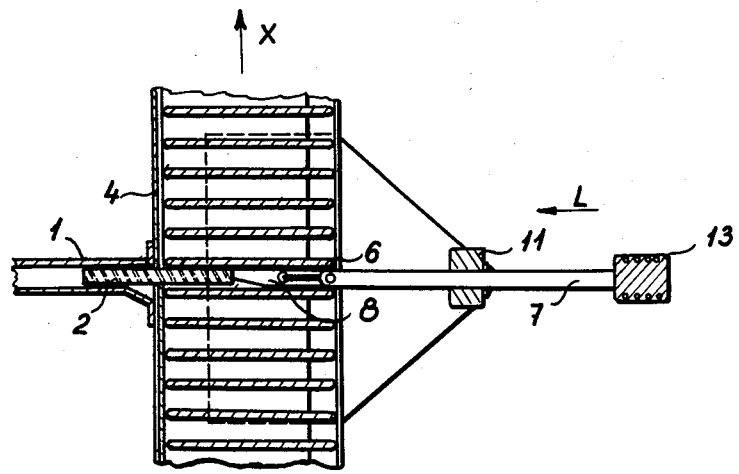

The principle of the present invention may be best understood in connection with the accompanying drawings, in which:

Figure 1 is a front view, partly broken away and in section, showing the device according to the invention for exchanging the slides in a projector, Figure 2 is a fragmentary enlarged view showing the end of the slide piece with the cam pivoted thereon for actuating the storage drawer and for inserting the slides into the picture gate, Figure 3 is a sectional view taken along the line III—III of Figure 2, Figure 4 is a fragmentary sectional view taken along the line IV—IV of Figure 1, and showing the device prior to the actuation of the slide-piece thereof, and Figure 5 is a sectional view similar to that of Figure 4, but showing the same device at the instant when a slide is being propelled along the guide for insertion into the projector gate.

The device for changing slides as shown in Figure 1, consists of a guide 1 made from sheet metal and suitably connected to the projector casing. The guide 1 serves to guide the slide 2 during insertion of the latter into the gate 3, through which the light beam is projected. Perpendicular to the guide 1 and parallel to the optical axis of the projector objective lens, there is provided a sheet-metal holder 4, supporting a storage drawer 5. The storage drawer 5, made of plastic, may slip freely within the holder 4. A number of slides 2 are inserted in the storage drawer. The slides are held in proper position by partition walls 6 which are part of the storage drawer 5 (Figs. 4 and 5). When a selected slide 2 is to be projected, such slide is pushed out of the storage drawer 5 and through the guide 1 into the gate 3, where it is traversed by the light beam. After the slide has been projected, the slide 2 is pushed back along guide 1 into the storage drawer 5.

The above described insertion of a slide in the gate 3 and its return to the storage door are effected by means of a mechanism shown in Figs. 2 and 3. This mechanism consists of a slide-piece 7, to which a cam 8 is attached by a pivot 10 to permit swinging of the cam 8 in one direction from a position aligned with the slide-piece 7. The cam 8 is urged to swing in that one direction by the action of the spring 9 anchored in a recess of the slide-piece 7. The pivoted end of the cam is shaped in form of a projection 8a engageable with slide-piece 7 for limiting the swinging movement of the cam by spring 9. The other or free end of said cam has a curved surface 8b as one side, whereas the other side has the shape of a flat plane 8d. Surfaces 8b and 8d are connected by a small supporting end surface 8c which serves for pushing the slide 2 through the guide 1. When the cam 8 is angularly displaced by the spring 9 relative to the slide-piece 7, the plane surface 8d is at an angle $\alpha$ in relation to the direction of movement of the slide-piece 7. The slide-piece 7 is slidably guided in a predetermined direction, a head 11 which is suitably attached to the holder 4 of the storage drawer 5. The head 11 also serves as a guide for a rod 12 (Fig. 1) which is connected to the slide-piece 7 by a suitably shaped handle 13 by which the whole device may be manually operated. The opposite end of the rod 12 carries a depending hook 14 (Fig. 1), the purpose of which is to push or return the slide 2 back into the storage drawer 5. The lower portion of the head 11 has a bore in which a detent mechanism is located and the latter consists of a ball 15, urged toward the end of the bore opening at the drawer 5 by a helical spring 16. The opposite end hole or bore in which the spring 16 is situated, is shut by a screw 17 against which the spring 16 abuts. The ball 15 is adapted to engage selectively in a row of recesses formed in the side wall of the storage drawer 5.

The device for changing slides in a projector in accordance with this invention, operates in the following manner:

When the handle 13 is pushed in the direction of arrow L Figs. 1, 3 and 4, the oblique or inclined flat surface 8d of the cam 8 rides against the edge of a partition wall 6 and shifts the whole storage drawer 5 in the direction of arrow X through a distance equal to the thickness of the slide 2. The storage drawer is releasably secured in this new position by means of the detent ball 15, which engages with one of the recesses in the side wall of the storage drawer 5. During such movement of the slide-piece 7, the curved surface 8d of the cam 8 rides against the next partition wall 6 of the storage drawer in such a manner that the cam 8 is angularly displaced into a straightforward position relative to the slide-piece, as shown in Fig. 5. During further movement of the slide-piece 7, the end edge 8c of the cam pushes the slide 2 through the guide 1 into the projector picture gate 3. When the handle 13, and therefore also the slide piece 7, is pulled back in the direction of arrow P (Fig. 1), the slide 2 is returned from the gate 3 into the storage drawer 5 by the hook 14. During this operation, the cam 8 of the slide-piece 7 travels out of the storage drawer 5, disengages the respective partition wall 6 and automatically swings into its oblique position, shown in Fig. 4, by the action of spring 9. The device is now ready for inserting the next slide into the gate of the projector.

The invention is not, of course, limited to the arrangement just described, which serves only as an example. A number of constructional variations may be designed without departing from the invention as defined in the appended claims. Thus, merely by way of example, the above described device for changing slides may be constructed as a supplement to an existing conventional projector, with the guide 1 being only temporarily inserted into the projector in place of a normal slide frame.

What I claim as new and desire to secure by Letters Patent of the United States, is:

1. In a slide projector having a picture gate and objective lens; a slide changing device comprising a storage drawer mounted on the projector for movement parallel to the optical axis of the objective lens and having parallel, spaced apart partition walls extending transversely with respect to the direction of movement of the drawer to define slide receiving compartments between the successive partition walls, a fixed guide extending from one side of said drawer to the picture gate for guiding a slide during the insertion thereof into the gate and during the return of the slide into said storage drawer, a slide-piece mounted at the other side of said drawer and movable longitudinally across the latter in alignment with said guide, an elongated, rigid cam member pivotally mounted, at one end, on the end of said slide-piece closest to said guide for swinging relative to the slide-piece about an axis which is parallel to the planes of said partition walls and perpendicular to the direction of the longitudinal movement of said slide-piece, and means urging said cam member to a normal position where it is angularly displaced relative to the direction of longitudinal movement of said slide-piece, said cam member being insertable between adjacent partition walls of said storage drawer upon movement of said slide-piece toward said guide to displace the storage drawer parallel to the optical axis of the objective lens through a distance substantially equal to the spacing between adjacent partition walls and then to push a slide from between the adjacent partition walls through said guide and into the picture gate.

2. In a slide projector; a slide changing device as in claim 1, wherein said cam member has one straight side edge which encloses an angle with said direction of movement of the slide-piece in said normal position and which rides against an edge of one of the adjacent partition walls between which the cam member is inserted to effect said displacement of the storage drawer, and the other side edge of the cam member has a curved portion adjacent its free end to engage the other of the adjacent partition walls between which the cam member is inserted and bring said cam member into longitudinal alignment with said slide-piece when said cam member pushes a slide from between said adjacent partition walls and through said guide.

3. In a slide projector; a slide changing device as in claim 2, wherein the pivoted end of said cam member has a projection extending therefrom and said slide-piece has a stop surface engageable by said projection to positively limit the swinging of said cam member at said normal position, so that, during the riding of said straight side edge of the cam member against an edge of the partition wall to displace the storage drawer, said cam member reacts positively against said slide-piece.

References Cited in the file of this patent

UNITED STATES PATENTS

| 2,427,164 | Stechbart | Sept. 9, 1947 |

FOREIGN PATENTS

| 20,501 | Germany | Aug. 9, 1956 |
| 23,600 | Germany | Aug. 16, 1956 |